Aug. 18, 1953  J. MILLS  2,648,977
APPARATUS FOR DETERMINING PRESSURE IN CONTAINERS
Filed Aug. 24, 1948
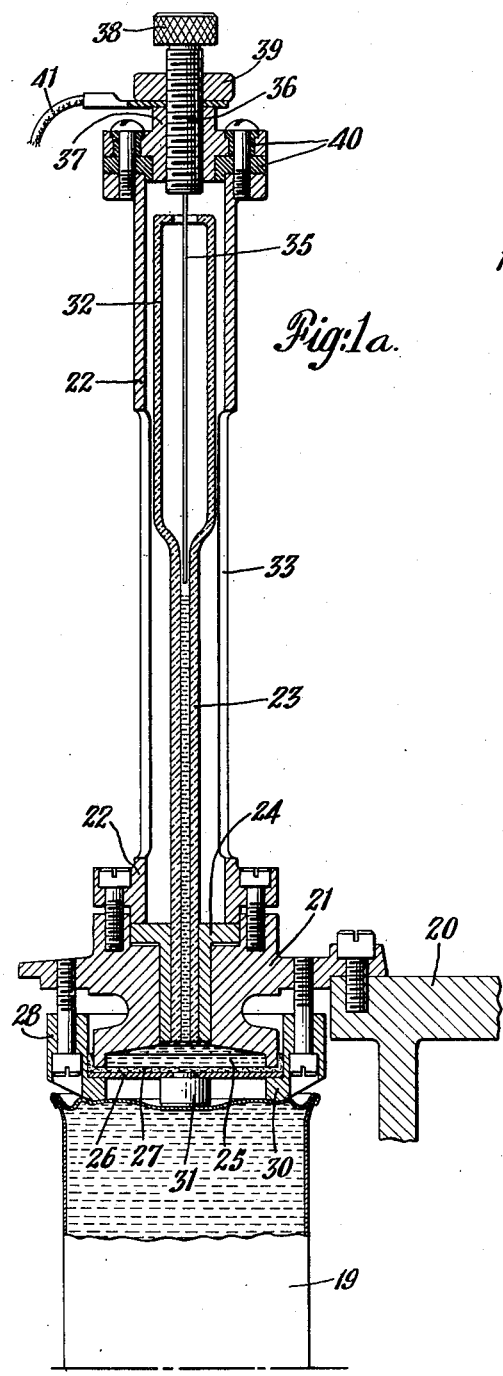
*Fig:1a.*
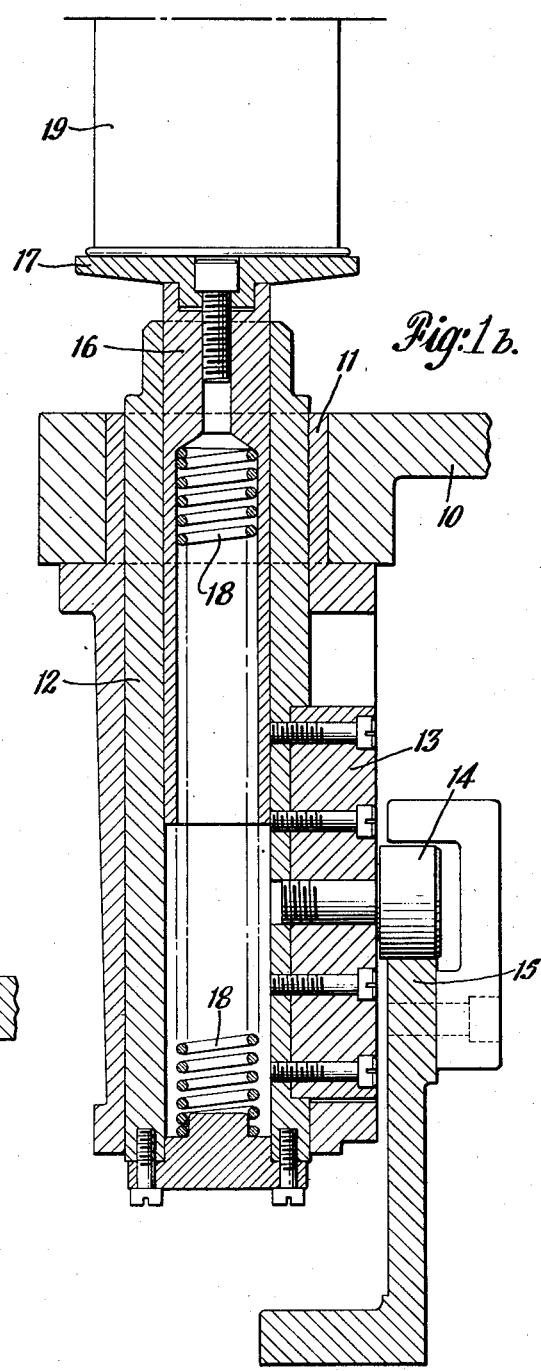
*Fig:1b.*
INVENTOR
JOHN MILLS
BY
N. Philip Churchill
ATTORNEY Patented Aug. 18, 1953

2,648,977

UNITED STATES PATENT OFFICE 2,648,977

APPARATUS FOR DETERMINING PRESSURE IN CONTAINERS

John Mills, Drexel Hill, Pa., assignor to Hires, Castner & Harris, Inc., Philadelphia, Pa., a corporation of Delaware Application August 24, 1948, Serial No. 45,816

6 Claims. (Cl. 73—52)

This invention relates to an apparatus for measuring or determining the relative amount of internal pressure in a sealed container.

A number of commodities are packaged under pressure so that an internal pressure above atmospheric pressure is maintained in the container in order to preserve its contents. Examples of such commodities are beer put up in cans and tennis balls which are some times packed under pressure in cans. It is most desirable in the packing of such products to be sure that each container when sealed, or some time after it is sealed, still retains a sufficient internal pressure to preserve properly the contents. Also, of course, it is desirable to determine the amount of such internal pressure without in any way puncturing or interfering with the seal of the container.

One object of this invention is to provide an apparatus for determining the amount of internal pressure in a container such as an ordinary tin can after the can is sealed.

Another object of this invention is the provision of such an apparatus for determining rapidly whether the internal pressure in a series of cans is above or below some specific pressure which is considered necessary in order to meet certain standards.

A further object of my invention is the provision of apparatus for making such measurements or determinations accurately regardless of variations in sizes of cans or in the resistance of different can ends to deflection.

These and other objects and advantages of the invention will be explained or will be apparent from a description of a preferred embodiment illustrated in the accompanying drawings, in which Figures 1a and 1b together are a longitudinal vertical sectional view through one measuring device constructed in accordance with my invention, Figure 1a showing the actual measuring device itself and Figure 1b showing the supporting apparatus for holding a can during the measurement.

The single measuring device shown in the drawings may be used alone or may be simply one of a plurality of such devices mounted upon a suitable turret head or other machine for determining in succession at high speed the pressure in a number of cans.

Referring particularly to Figure 1b, frame member 10, which may be part of a turret head or similar device, supports in a suitable bearing 11 a vertically movable cylinder 12. Fixed to one side of the cylinder 12 is a plate 13 in which is journaled a follower or roller 14 adapted to ride on a suitable stationary track 15. Thus, relative motion between the frame 10 and track 15 will cause the roller 14 to be raised or lowered as the track goes up or down, thus raising or lowering in turn the cylinder 12. Cylinder 12 is provided internally with a vertically movable piston 16, to the upper end of which a can supporting platform 17 is attached. Piston 16 is held in raised position by an internal compression coil spring 18 which permits some downward give to the platform 17.

Containers to be measured, such as ordinary tin cans full of beer, are fed by a suitable apparatus (not shown) to a position resting on the platform 17, as shown at 19 in the drawings. The measuring device itself is located above the can 19, and is bolted or otherwise fixed to the frame 20 which may be a simple fixed mounting, or a part of a rotating turret head along with the frame member 10.

The main housing 21 of the measuring device may have bolted or otherwise secured thereto a tall, hollow column 22 which surrounds a tube 23, preferably constructed of suitable transparent material such as glass, supported in a bushing 24 extending down through the center of the housing 21. The lower end of the glass tube 23, which is hollow, thus communicates with a cavity 25 in the bottom of the housing 21, which may be filled with mercury or other similar indicating liquid.

A stiff diaphragm 26, preferably made of spring steel or the like, together with a sealing gasket 27 of flexible material, such as rubber or other suitable material, is securely clamped over the cavity 25 by means of the ring 28 bolted to the housing 21. Ring 28 has a downwardly projecting annular flange 30 made of hardened steel or other similar material and adapted to be pressed firmly against the top of the can 19. Diaphragm 26, the edges of which are held in a fixed position relative to flange 30, has fixed on its center a downwardly projecting nose 31 also made of hardened steel or similar material. The cavity 25, being filled with mercury above the diaphragm 26, provides a reservoir of mercury, the volume of which is changed by deflection of the diaphragm 26. The central opening of the tub 23 is in free communication with this reservoir in the cavity 25 so that the mercury extends up into the tube 23 and the column of mercury thus moves up and down in the tube depending upon the amount of deflection of the diaphragm 26. The upper end of tube 23 is provided with an enlarged section 32 forming an overflow chamber for mercury from the main part of the tube 23. The hollow column 22 is preferably cut away as at 33 to permit visual inspection of the height of the liquid column in the tube 23. It will be apparent that the tube 23 may be suitably graduated and calibrated to indicate measurements of pressure on any desired scale, the measurements being simply read by visual inspection of the scale.

The apparatus may also be used to reject from a turret head machine those cans which have insufficient pressure inside them to measure up to specifications, and for this purpose an electrode in the form of a thin wire or needle 35 attached to a threaded stem 36 may be mounted in a bushing 37 fixed to the top of the column 22 so that the wire 35 projects down inside the tube 23 but does not block its passage. The stem 36 may be rotated by a knurled knob 38 and provided with a suitable locking nut 39, so that the wire can be adjusted up or down to the desired position and then held firmly in place.

Rubber or other insulating grommets and washers 40 may be employed to insulate the wire 35 and its mounting from the main part of the machine. Thus, a wire 41 connected electrically to the wire or needle 35 may form a part of a circuit which is completed by contact of the wire 35 with the mercury in tube 23 to indicate in some fashion when the mercury column does or does not come up into contact with the needle because of insufficient pressure inside the can under test. Alternatively, the wire 41 may be used to operate any suitable electrical circuit so as to reject from the line cans which do not have sufficient pressure inside them to force the mercury up into contact with wire 35.

In the operation of this device, a can 19 is placed by hand or suitable mechanism on the platform 17, and the roller 14 moving along the track 15 is raised, which in turn raises the cylinder 12 and platform 17 until the spring 18 is compressed which firmly presses the hardened steel ring 30 and the hardened steel nose 31 attached to diaphragm 26 against the top cover of the can 19.

The ring or flange 30 is pressed firmly against the can top, preferably inside any ribs or flanges on the can top so that the can top inside the ring 30 forms a diaphragm of known size formed by a smooth area of can top. If there is a substantial pressure inside the can, this area of the top will be bulged upwardly by the internal pressure. The lower end of nose 31 bears a definite and known relationship to the reference plane formed by the lower surface of ring 30. Thus, since the can top bulges upwardly the lower end of nose 31 may even be above, although it is preferably even with or, as illustrated, below this reference plane. In any event, nose 31 is pressed against the can top with a known and predetermined force preferably sufficient to deform or press in the center of the can top a given amount each time, the amount being determined by the relative positions of the lower surface of ring 30 and the lower surface of the nose piece 31. This deformation of the can end in turn generates a resisting force the amount of which is dependent on the internal pressure in the can. Thus if the internal pressure in the can is sufficient, the resisting force produced will deflect the diaphragm 26 upwardly enough to lift the column of mercury in tube 23 into contact with the end of the wire or electrode 35. On the other hand if the internal pressure in the can is not high enough, the resisting force on the diaphragm 26 will not lift the mercury column into contact with wire 35. In this fashion, the height of the mercury column in tube 23 becomes a measure of the internal pressure in the can.

Variations in the resistance of the can top to deflection because of variations in the thickness or temper of the metal do not affect to any appreciable extent the accuracy of the apparatus in measuring the internal pressure in the can. The reason for this is that the force urging the can top to bulge and the force used to press the nose 31 into the can top are both large enough so that variations in resistance of the can top to deflection are relatively negligible. The force pressing nose 31 against the can top is a known or constant factor which is usually larger than the force of the unknown internal pressure in the can. By this procedure unusual accuracy of measurement is obtained which is not thrown off by indentations, deformations or other irregularities in the can top, or by variations in the thickness or temper of the metal can top.

The apparatus of my invention may be used to determine the internal pressure in containers during an intermediate stage in the packing operation as well as after the packaging of goods has been completed. For example, in the packing of various food products, the contents are cooked or sterilized in the container, which should generate a certain amount of internal pressure if properly done, and then cooled. The method and apparatus of my invention may easily be used to advantage in testing such containers for the requisite amount of pressure before they are cooled.

Such a device may be used not only to determine and reject cans or other containers which have insufficient internal pressure to measure up to specifications but also cans which are not filled up to the desired level. In such slack filled cans, there is necessarily a larger space for compressible gas between the top of the can and surface of the liquid, so that the resisting force generated by inward deflection of the can top is insufficient to lift the mercury column into contact with the wire 35.

The device of my invention may also be employed to reject both cans having too high an internal pressure as well as those having too low a pressure by the simple expedient of providing a second wire 35 in the tube 23 which terminates above the end of the first wire. Thus, with too much internal pressure, the mercury would come up in contact with the second wire also to actuate an indicating or rejecting mechanism.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A device for determining the internal pressure in a sealed container having a relatively flat top which comprises a liquid reservoir communicating with a column in which the liquid rises upon compression of the reservoir, a diaphragm arranged to compress said reservoir, a projection attached to said diaphragm, said diaphragm being flexible but sufficiently stiff and strong to press said projection against said top with sufficient force to produce inward deflection thereof, and means fixed to said device to bear against the outer portion of said top and thereby space said diaphragm a predetermined minimum distance from said top.

2. A device for determining the internal pressure in a sealed container having a relatively flat top which comprises a liquid reservoir communicating with a column in which the liquid rises upon compression of the reservoir, a diaphragm arranged to compress said reservoir, a projection attached to said diaphragm, an annular member surrounding said projection and fixed in relation to said diaphragm, said diaphragm being sufficiently strong and stiff to press said projection against said top with sufficient force to produce inward deflection thereof when said annular member is in contact with the top.

3. A device as defined in claim 1 in which the liquid is mercury and an electrode is provided in the column to complete an electrical circuit upon contact with said mercury.

4. Apparatus for measuring the internal pressure in a can which comprises a reservoir and communicating tube containing an indicating liquid, a stiff, flexible diaphragm forming a wall of said reservoir, a nose piece fixed to the central portion of the diaphragm, a fixed ring surrounding said nose piece, and means for pressing an end of a can firmly against said ring and nose piece, said nose piece being positioned relative to said ring so as to deflect the can end inwardly.

5. Apparatus for measuring the internal pressure in a can which comprises a reservoir and communicating tube containing an indicating liquid, a stiff, flexible diaphragm forming a wall of said reservoir, a nose piece fixed to the central portion of the diaphragm, and means for pressing said nose piece against one end of a can with a predetermined amount of force sufficient to deflect said can end inwardly against the internal pressure in the can.

6. Apparatus for measuring the internal pressure in a can which comprises a reservoir and communicating tube containing an indicating liquid, a stiff, flexible diaphragm forming a wall of said reservoir, a nose piece fixed to the central portion of the diaphragm, said reservoir, diaphragm and associated parts being held in relatively fixed position, and means for lifting the can into a position such that the can top is held in a given fixed position relative to said nose piece and is pressed against said nose piece with a predetermined amount of force sufficient to deflect said top inwardly.

JOHN MILLS.

References Cited in the file of this patent

UNITED STATES PATENTS

| Number | Name | Date |
|---|---|---|
| 1,825,699 | Landrum | Oct. 6, 1931 |
| 1,875,862 | Fair | Sept. 6, 1932 |
| 1,900,285 | Huber | Mar. 7, 1933 |
| 2,011,332 | Chapman | Aug. 13, 1935 |
| 2,374,140 | Shoner | Apr. 17, 1945 |
| 2,418,379 | Wallace | Apr. 1, 1947 |
| 2,433,043 | Gray | Dec. 23, 1947 |
| 2,445,176 | Hoffman | July 13, 1948 |